Patented May 22, 1945

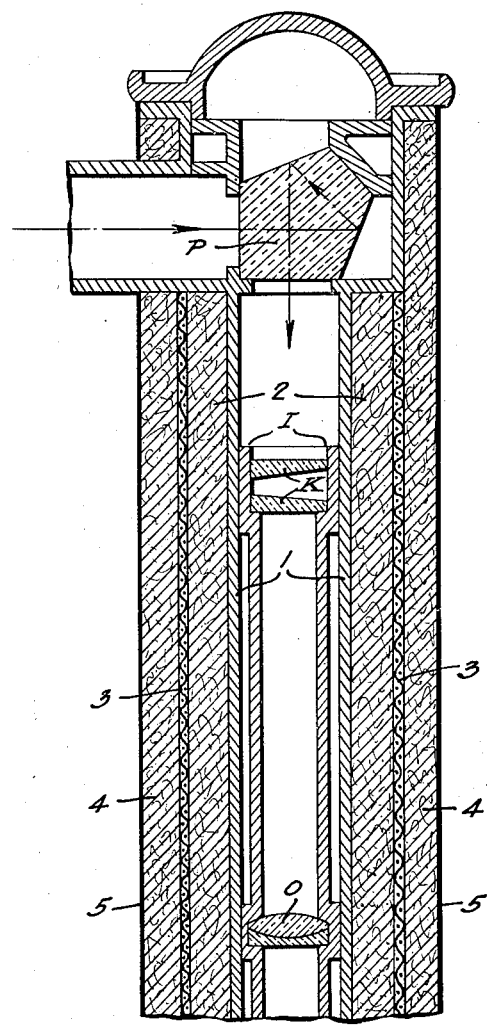

2,376,710

UNITED STATES PATENT OFFICE 2,376,710

ARRANGEMENT FOR AVOIDING ERRORS IN MEASUREMENT DUE TO ONE-SIDED HEATING OF THE CASES OF OPTICAL INSTRUMENTS

Max Maurer, Vienna, Germany; vested in the Alien Property Custodian

Application April 15, 1941, Serial No. 388,710
In Germany June 12, 1939

5 Claims. (Cl. 154—44)

It is known that errors which might impair the value of measurement results in an inadmissable degree, are caused by heat dilatation of the cases of long optical measuring instruments, such as rangefinders, astronomical instruments, collimators, telephoto lenses, etc., due to one-sided sun irradiation or to irregular heating caused by temperature gradients or air currents in laboratories.

According to the invention these disadvantages of one-sided heating of optical measuring instruments can be avoided by surrounding the instrument cases by heat insulating materials, such as felt wrappings, and by inserting between the insulting layers flexible layers of good heat conductors, such as copper or aluminum wire nets, wire windings, etc., the function of which is to distribute heat between the hot and the cool parts of the instruments without transmitting any heat tensions to the real instrument cases. If the very temperature elevation caused by this heat distribution should involve errors in observation or measurement, these errors could be easily eliminated in a know manner by appropriate compensation organs provided with bimetallic springs.

To protect this exterior insulating layer against moisture, it is covered by a waterproof coating (rubber or the like).

Obviously the heat leveling effect of the arrangement is increased by use of two or more of such heat conducting layers, eventually separated by felt layers, instead of one.

The invention is shown in the annexed drawing by way of example on the end part of a base rangefinder.

In the tube 1, in the end of which the prism P is located, the optical system consisting of turning wedges K, objective lens O and the other optical elements required (not shown) is arranged in a known manner in an interior tube I. The tube 1 is concentrically surrounded by a cylindrical felt layer 2, the latter is surrounded by a concentric loose copper or aluminium wire net 3 which is again wrapped in a concentric loose felt layer 4 which is finally coated by the rubber skin 5.

Instead of the wire net, a smooth or coiled copper or aluminium wire winding can be used.

By these heat insulating layers, the heat irradiated on one side which by irregular heat dilatation would cause bending of the tube and accordingly displacement of the optical image on the graticule, is considerably diminished and by the inserted wire nettings the small heat quantity still passing through the insulating layers is equally distributed over the whole circumference of the insulating layer inside the metal net. Of course, the more insulating layers alternating with conducting layers are applied, the better is the heat distribution.

What I claim is:

1. Means for avoiding errors in measurement due to one-sided heating of elongated casings of precision instruments or the like, comprising a plurality of superimposed heat insulating layers completely surrounding the sides of said casings, and flexible layers having good heat conductivity inserted between adjacent heat insulating layers, and arranged to uniformly distribute all around the casing heat penetrating to such flexible layers.

2. Means for avoiding errors in measurement due to one-sided heating of tubular casings of precision instruments or the like, comprising a plurality of superimposed heat insulating layers entirely surrounding the sides of said casings, and sheets of wire mesh having good heat conductivity inserted between adjacent heat insulating layers, and arranged to uniformly distribute all around the casing the heat penetrating to such sheets.

3. Means for avoiding errors in measurement due to one-sided heating of elongated tubes of precision instruments or the like, comprising a plurality of superimposed heat insulating layers completely surrounding the sides of said tubes, and wrappings of smooth wire windings having good heat conductivity encircling said tubes between adjacent heat insulating layers, and arranged to uniformly distribute all around the casings any heat penetrating to such wrappings.

4. In means as set forth in claim 3, said wire wrappings comprising smooth copper wire windings.

5. A precision instrument such as an optical instrument, having a longitudinally extended casing containing the sensitive parts of the instrument which need be protected against one-sided heating, characterized by the provision of a plurality of superimposed heat insulating layers entirely surrounding the sides of said casing, and flexible heat conducting layers disposed between adjacent heat insulating layers, said flexible conducting layers being arranged to carry heat all around the instrument casing for uniform distribution.

MAX MAURER.